Figure 1:
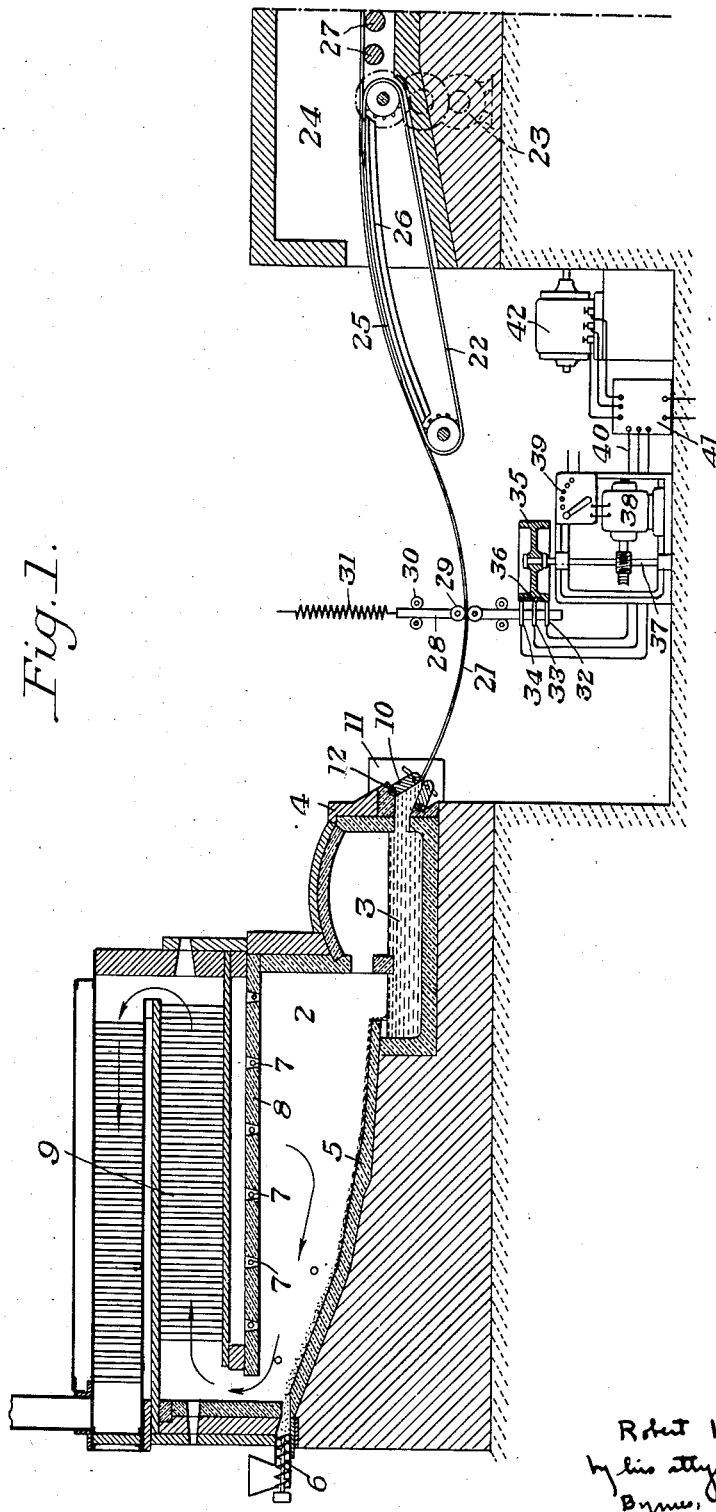

Sept. 15, 1931. R. L. FRINK 1,823,357
MAKING SHEET GLASS
Filed July 27, 1927 2 Sheets-Sheet 1

INVENTOR
Robert L. Frink,
by his attys,
Byrnes, Stebbin & Parmelee

Sept. 15, 1931.    R. L. FRINK    1,823,357
MAKING SHEET GLASS
Filed July 27, 1927    2 Sheets-Sheet 2
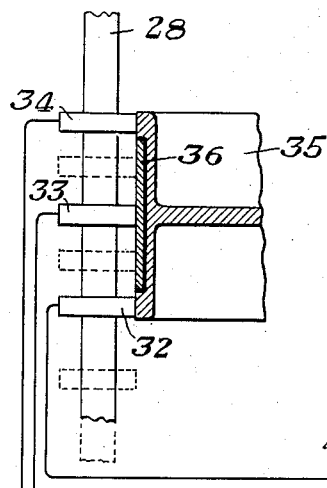
Fig. 2.
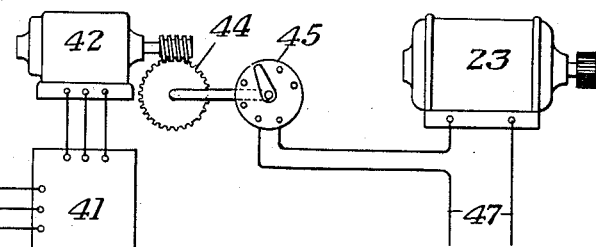
Fig. 3.
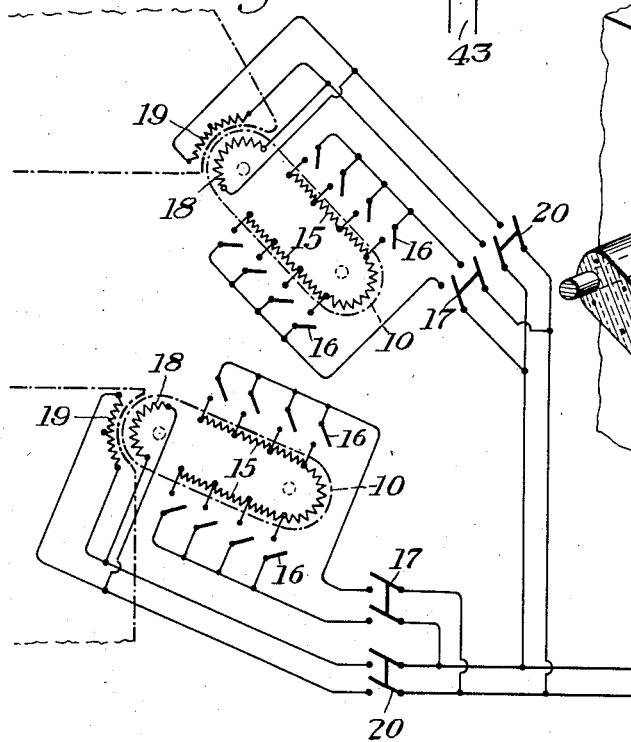
Fig. 4.
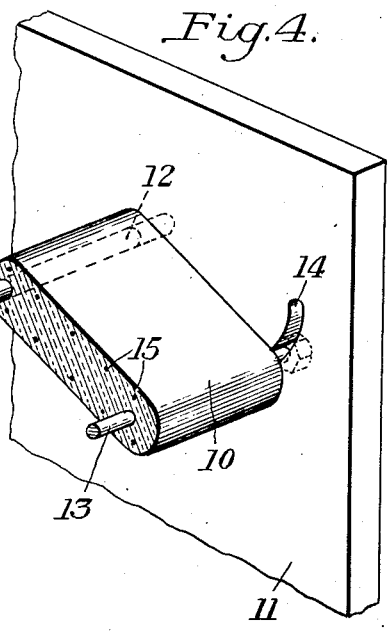
INVENTOR
Robert L. Frink
by his attys,
Byrnes, Stebbins Parmelee Patented Sept. 15, 1931

1,823,357

UNITED STATES PATENT OFFICE

ROBERT L. FRINK, OF LANCASTER, OHIO

MAKING SHEET GLASS

Application filed July 27, 1927. Serial No. 208,734.

This invention relates to the making of sheet glass, and is herein described as employed in a system wherein glass is caused to flow through a slot in a container wall. However, certain features of the invention have other applications.

Various methods of making sheet glass have been proposed, but most of them are open to objections, either on the ground of cost or of low quality product. I provide a simple method and apparatus whereby sheet glass of high quality may be produced at low cost.

Control of the sheet is of great importance in any apparatus of this character. I provide automatic means for controlling the apparatus, this means being actuated by the sheet itself. It is preferably of such character that it acts in a step-by-step manner, thus preventing "hunting".

I preferably employ a container having a flow slot formed therein, this slot being so arranged that its vertical position may be varied. I thus am able to vary the head of glass on the slot. This is particularly true where the constituent materials are supplied in a substantially continuous manner, thereby making the whole operation smooth and regular.

I arrange for supplying the constituent materials at a rate substantially corresponding to the rate at which molten glass is withdrawn from the furnace. The furnace preferably employed comprises an inclined refractory slab over which the constituent materials flow by gravity. The material is melted in a thin spread-out condition and, therefore, the glass is formed far more rapidly and with considerably less fuel than in a tank furnace of the ordinary type. In a sheet glass furnace where molten glass is being continuously withdrawn at a relatively rapid rate, it is very important that thorough melting be obtained, as otherwise the glass will be of unsalable quality. Many continuous sheet making processes adapted to be operated at high speed have failed in practice because of the inability of the ordinary type of tank to supply the glass at the rate required.

The flow slot is preferably formed by the adjacent faces of a pair of movable slabs forming a part of the receptacle wall. The slabs are pivotally mounted and may be adjusted to different positions so as to vary the vertical position of the slot, and also to vary its width, as is desired in drawing glass of different thicknesses.

The slabs preferably have electrical resistance elements embedded therein so as to permit of heating the slabs. In this way the glass at the flow slot may be maintained at a desired temperature. Another advantage of the electric resistances is that the joint between a slab and the container proper may be heated so as to permit of more ready movement of the slab. Glass will normally tend to collect in this joint and freeze, but by applying heat at the joint the intervening glass may be rendered fluid enough to permit of the desired adjustment.

As the glass leaves the flow slot it is carried across an open space, where it is substantially unsupported, and onto a conveyer which takes it into a leer. The control means is preferably arranged to act on the unsupported portion of the sheet. As the glass travels from the slot to the conveyor it is stretched and the tendency to form ripples is removed. The glass has an opportunity to form a surface skin so that it will not be marked by the conveyor.

The speed of the conveyor is controlled in accordance with the amount of droop of the sheet as it travels across the open space.

The conveyor is preferably arranged so as to stretch the upper surface of the glass in an amount corresponding to the stretch of the under side as it travels over the open space, thus insuring the production of a flat sheet.

In the accompanying drawings, which illustrate, more or less diagrammatically, the present preferred embodiment of my invention, Figure 1 is a vertical longitudinal section through a furnace, leer and glass-forming apparatus embodying the invention, Figure 2 is a wiring diagram of a portion of the control apparatus;

Figure 3 is a wiring diagram showing electrical connections for heating the slabs forming the flow slot; and Figure 4 is a perspective view showing the pivotal mounting of a flow slab.

In the illustrated embodiment of the invention there is shown a furnace, indicated generally by the reference character 2, adapted to continuously supply molten glass to a pool 3 in a container 4. The furnace 2 is more specifically described and claimed in my copending application, Serial No. 160,986, filed January 13th, 1927. It comprises a refractory slab 5 over which the materials to be melted flow by gravity. The material is supplied at 6 and the furnace is kept hot by burners 7 in the roof 8. The hot gases travel in the direction of the arrows through a recuperator structure 9 on top of the furnace. This furnace, although it may be held to relatively small dimensions, is capable of melting glass at a much higher rate than are tanks of ordinary construction, and it is therefore particularly desirable in connection with a sheet-forming apparatus.

The feeder shown at 6 is arranged to supply material in a substantially continuous manner and at a rate corresponding to the withdrawal of glass from the pool 3 so as to maintain the lever of the pool 3 substantially constant.

The container 4 gradually increases in width from the left hand to the right hand end as viewed in Figure 1, so that the velocity of the glass gradually decreases. This gives the small bubbles a better opportunity to pass out of the bath, thus putting the glass in condition for sheet forming.

The flow slot is formed from a pair of slabs 10 arranged between end walls 11. The slabs are rounded at both ends. Their rear ends fit into corresponding recesses in a wall of the container 4. The slabs are pivotally mounted on rods 12. The slabs are provided adjacent their forward ends with rods 13 passing through slots 14 in the end walls 11. The slots 14 will be terminated at such point that there will be no opportunity for leakage of glass therethrough.

The slabs 10 may be made entirely, or may have a surface portion of fused silica, as described in Patents 1,593,566 and 1,593,567 to C. P. Byrnes, dated July 7th, 1926.

Each slab 10 has electrical resistance elements 15. As shown diagrammatically in Figure 3, the several resistance elements are provided with switches 16 so as to regulate the number of elements which are in the circuit. Main switches 17 are provided for controlling the current to each slab 10. Each slab is provided adjacent its rear end with a resistance element 18 and a corresponding element 19 is formed in the adjacent portion of the container wall. The flow of current to these resistance elements is controlled by switches 20. They are heated when it is desired to shift the slabs. They render the glass which collects in the joint sufficiently fluid to permit of easily adjusting the slabs.

The head of glass on the slot may be controlled by simultaneously varying the vertical position of the slabs, while the width of the slot may be varied by shifting them relative to one another. As the glass leaves the flow slot it is carried across an open space, as indicated at 21, to a conveyor 22. This conveyor is driven by a motor 23 and is effective for carrying the glass into a leer 24. The top run 25 of the conveyor is carried over convex guides 26. These guides cause the glass to be convexed upwardly as it passes over the conveyor. The glass droops and stretches of its own weight in the open space 21, and the lower surface is stretched more than the upper surface. The humped conveyor flexes the glass in the opposite direction and imparts sufficient stretch to the upper surface to compensate for the stretch of the under side. After the glass leaves the conveyor 22, it is supported by rolls 27.

The speed of the motor 23 is controlled in accordance with the amount of stretch or droop of the sheet between the flow slot and the conveyor 22. A follower 28 having wheels 29 for engagement with the glass sheet is effective for regulating the speed of the motor 23. The follower 28 is mounted between rollers 30 and is counterbalanced by a spring 31. It is made as light as possible so as to respond quickly to variations in the amount of droop of the sheet.

On its lower end the follower 28 carries three brushes 32, 33 and 34. These brushes engage the periphery of a drum 35 made of non-conducting material and having a relatively narrow conducting strip 36 embedded in the periphery thereof. The drum 35 is mounted on a shaft 37 and is rotated by a motor 38. The speed of the motor is controlled by a rheostat 39.

The normal position of the brushes 32, 33 and 34 is as shown in solid lines in Figure 2. It will be noted that if they are in this position the middle one only can engage the strip 36. If, however, the follower 28 is raised or lowered, the brush 33 will be electrically connected through the strip 36 to either the brush 32 or the brush 34, depending upon whether the follower 28 moves up or down. This connection will be maintained for only a very short period of time and will then be broken by rotation of the drum 35.

The brushes 32, 33 and 34 are connected through wires 40 to a control box 41 of a motor 42. Current is supplied through wires 43. If the follower 28 is lowered, current flows through a circuit, including the contacts 33 and 34, and causes the motor 42 to rotate in one direction. If the follower 28 moves upwardly, current flows in a circuit, including the brushes 33 and 32, and causes the motor 42 to rotate in the opposite direction. The motor 42 is connected through worm gearing 44 to the arm of a rheostat 45 in the circuit 46 of the motor 23. If the follower 28 moves upwardly the arm of the rheostat 45 will be moved in such direction that the motor 23 slows down. If the follower 28 is lowered the motor 23 will be speeded up.

The advantage of this system of control is that the arm of the rheostat 45 will be adjusted only a small amount, and the conditions thus imposed will have time to become fully established before the strip 36 is again in position to complete the circuit of the motor 42. During this interim the follower 28 will have had an opportunity to find a new position. If this new position is the correct one (shown in solid lines in Figure 2) the motor 23 will continue to run at the adjusted speed. If, however, the glass for some reason droops, the motor 23 will be speeded up. If the glass assumes a more nearly straight line than that which corresponds to the normal position, the motor will be slowed down.

I have illustrated and described a preferred embodiment of the invention. It will be understood, however, that it is not limited to the form shown, as it may be otherwise embodied or practiced within the scope of the following claims.

I claim:

1. The method of making sheet glass which comprises carrying a formed sheet across a horizontal space while substantially unsupported, supporting the sheet after it passes over the space, and bending the sheet in such direction that the upper side is convexed.

2. The method of making sheet glass which comprises carrying a formed sheet across a horizontal space while substantially unsupported, supporting the sheet after it passes over the space, and bending the sheet in such direction that the upper side is convexed an amount sufficient to compensate for stretch of the under side as it travels over the space.

3. Apparatus for making sheet glass including a container, a pair of pivoted slabs formed in a wall thereof and cooperating to form a slot, and means for shifting the slabs in a vertical direction.

4. Apparatus for making sheet glass comprising a container, a pair of pivoted slabs formed in a wall thereof and cooperating to form a flow slot, the container wall being recessed to receive the slabs, means for shifting the slabs, and heating means adjacent the recesses.

5. Apparatus for making sheet glass including means for forming a sheet of glass, and a conveyor horizontally spaced therefrom, whereby the glass sheet extends from the forming means to the conveyor in a substantially unsupported manner, the conveyor having an upwardly convexed supporting surface.

6. The method of making sheet glass which comprises substantially continuously forming a glass sheet, causing the same to travel in an unsupported horizontally-extending path whereby the glass droops in such travel, and thereafter causing flexing of the glass in a direction opposite to the direction in which it is flexed during such drooping.

7. Apparatus for making sheet glass comprising a tank having an opening in a side thereof and a pair of slabs arranged adjacent the opening, one slab being above the other, the slabs cooperating to form a flow opening, the slabs at their edges adjacent the opening being pivoted and being arranged to be swung around their pivots whereby the point of issuance of glass from between the outstanding edges of the slabs may be adjusted in a vertical direction.

In testimony whereof I have hereunto set my hand.

ROBERT L. FRINK.